US009250993B2

(12) United States Patent
Mani et al.

(10) Patent No.: US 9,250,993 B2
(45) Date of Patent: Feb. 2, 2016

(54) AUTOMATIC GENERATION OF ACTIONABLE RECOMMENDATIONS FROM PROBLEM REPORTS

(71) Applicant: International Business Machines Corporation, Armonk, NY (US)

(72) Inventors: Senthil K. K. Mani, New Delhi (IN); Karthik Sankaranarayanan, Bangalore (IN); Vibha S. Sinha, New Delhi (IN); Karthik Visweswariah, Bangalore (IN)

(73) Assignee: GLOBALFOUNDRIES INC, Grand Cayman (KY)

( * ) Notice: Subject to any disclaimer, the term of this patent is extended or adjusted under 35 U.S.C. 154(b) by 52 days.

(21) Appl. No.: 13/874,390

(22) Filed: Apr. 30, 2013

(65) Prior Publication Data

US 2014/0325254 A1   Oct. 30, 2014

(51) Int. Cl.
G06F 11/00 (2006.01)
G06F 11/07 (2006.01)
G06F 17/30 (2006.01)

(52) U.S. Cl.
CPC ...... *G06F 11/0793* (2013.01); *G06F 17/30598* (2013.01)

(58) Field of Classification Search
USPC .......................................................... 714/26
See application file for complete search history.

(56) References Cited

U.S. PATENT DOCUMENTS

| | | | |
|---|---|---|---|
| 6,266,788 B1 | 7/2001 | Othmer et al. | |
| 7,191,364 B2 | 3/2007 | Hudson et al. | |
| 7,890,802 B2 | 2/2011 | Gerber | |
| 7,890,814 B2 | 2/2011 | Zhang et al. | |
| 8,028,197 B1* | 9/2011 | Barua et al. | 714/26 |
| 8,108,413 B2 | 1/2012 | Kar et al. | |
| 8,140,514 B2 | 3/2012 | Nguyen et al. | |
| 8,161,325 B2 | 4/2012 | Calman et al. | |
| 8,260,773 B2 | 9/2012 | Jennings, III et al. | |
| 2004/0243561 A1* | 12/2004 | Cody et al. | 707/3 |
| 2009/0063125 A1 | 3/2009 | Faisman et al. | |
| 2009/0313219 A1 | 12/2009 | Gupta et al. | |
| 2011/0113047 A1* | 5/2011 | Guardalben | 707/754 |
| 2011/0296243 A1* | 12/2011 | Calman et al. | 714/26 |
| 2012/0023044 A1 | 1/2012 | Anerousis et al. | |
| 2012/0150859 A1* | 6/2012 | Hu | 707/737 |
| 2012/0151278 A1 | 6/2012 | Tsantilis | |
| 2012/0254162 A1* | 10/2012 | Asadullah et al. | 707/723 |
| 2014/0149411 A1* | 5/2014 | Anand et al. | 707/737 |
| 2014/0201750 A1* | 7/2014 | Shoulberg, Richard W. | 718/103 |

OTHER PUBLICATIONS

Agarwal, Shivali et al., "SmartDispatch: Enabling Efficient Ticket Dispatch in an IT Service Environment," KDD'12, Beijing, China, Aug. 12-16, 2012, pp. 1393-1401, ACM Digital Library.

(Continued)

*Primary Examiner* — Kamini Patel
(74) *Attorney, Agent, or Firm* — Ference & Associates LLC

(57) ABSTRACT

Methods and arrangements for handling information technology tickets. A plurality of information technology tickets are received. The tickets are clustered into categories, and a problem area is identified with respect to at least one of the categories. At least one recommendation is automatically generated for addressing the problem area. Other variants and embodiments are broadly contemplated herein.

20 Claims, 11 Drawing Sheets

| A | B | C | D | E | F | G | H | I | J | K | L | M | N |
|---|---|---|---|---|---|---|---|---|---|---|---|---|---|
| TT# | Ticket Type | Priority | Dashboard Pri. | Status | Create-date | Modified-date | Fixed-date | Close-date | Assignee Team | Service Area | Application | Short Description | Running notes |
| 5085258 | Request | 9 | Low | Closed | -/-/- #:# | -/-/- #:# | -/-/- #:# | -/-/- #:# | --- | --- | --- | ... | ... |
| 5428495 | Incident | 4 | Medium | Closed | -/-/- #:# | -/-/- #:# | -/-/- #:# | -/-/- #:# | --- | --- | --- | ... | ... |
| 5445967 | Request | 9 | Low | Closed | -/-/- #:# | -/-/- #:# | -/-/- #:# | -/-/- #:# | --- | --- | --- | ... | ... |
| 5515161 | Request | 9 | Low | Fixed | -/-/- #:# | -/-/- #:# | -/-/- #:# | -/-/- #:# | --- | --- | --- | ... | ... |
| ... | ... | ... | ... | ... | ... | ... | ... | ... | ... | ... | ... | ... | ... |

101 ........ 103

(56) References Cited

OTHER PUBLICATIONS

Turbitt, Ken et al., "Leveraging the Synergy between Identity Management and ITIL Processes," Best Practices White Paper, bmcsoftware, 9 pages. available at http://rjrinnovations.com/rjr_docs/WHITE_PAPER_THOUGHT_LEADERSHIP_Leveraging_Synergies_between_Identity_and_ITIL.pdf as of Apr. 22, 2013.

Kent, Karen et al., "Guide to Integrating Forensic Techniques into Incident Response," Recommendations of the National Institute of Standards and Technology, NIST, Technology Administration U.S. Department of Commerce, Special Publications 800-86, Computer Security Division, Aug. 2006, 121 pages, National Institute of Standards and Technology, Gaithersburg, Maryland, USA.

Support Practices/BMC Service Desk Express User Guide, Service Desk Express User Guide, 70 pages. available of at http://www.ccs.uottawa.ca/professionals/support-magic/bmcsde.pdf as of Apr. 22, 2013.

Gupta, Rajeev et al., "Automating ITSM Incident Management Process," International Conference on Autonomic Computing, Chicago, Illinois, USA, Jun. 2-6, 2008, pp. 141-150, IEEE Computer Society, Washington, D.C., USA.

Godbole, Shantanu et al., "Building Re-usable Dictionary Repositories for Real-world Text Mining," CIKM'10, Toronto, Ontario, Canada, Oct. 26-30, 2010, 10 pages, ACM Digital Library.

Dubey, Avinava et al., "A Cluster-Level Semi-Supervision Model for Interactive Clustering," The European Conference on Machine Learning (ECML) and Principles and Practice of Knowledge Discovery on Databases (PKDD), Barcelona, Spain, Sep. 2010, 16 pages. available at https://2210d92e-a-62cb3a1a-s-sites.googlegroups.com/site/kumaravinavadubey/publication/ecml10.pdf?attachauth=ANoY7cr-3kmVHzcV4OR_GtlvsA3JT15ukrBasr4m8XWx-dB4HUy5hbcWBNDIygdRgDeNPQapzz4ziv1nCKDZ89J9JSm-TZZ8GxMshgJzelhLJW6VdRP8B6FgQjxi4AGVfhA9Adc3XNa-Hv1jAZJHaR5GYzRUnGepsEjWEAkRnjOQJfONLcGZuf9lvvJp-AXhLfv45okeL-nDVzdl9uQQh5BpDCBpXJ_emgayMe04cXorWvU_mZOBn_DS17o%3D&attredirects=0.

Raghavan, Preethi et al., "Extracting Problem and Resolution Information from Online Discussion Forums," 16th International Conference on Management of Data COMAD 2010, Nagpur, India, Dec. 9-12, 2010, 11 pages, Computer Society of India.

Henss, Stefan et al., "Semi-automatically Extracting FAQs to Improve Accessibility of Software Development Knowledge," 34th International Conference on Software Engineering, ICSE, Zurich, Switzerland, Jun. 2-9, 2012, 11 pages, IEEE Digital Library.

Di Lucca, G. A. et al., "An Approach to Classify Software Maintenance Requests," Proceedings of the International Conference on Software Maintenance (ICSM'02), Montreal, Canada, Oct. 3-6, 2002, 10 pages. available at http://www.rcost.unisannio.it/mdipenta/papers/icm2002class.pdf.

Ko, Andrew J. et al., "Mining Whining in Support Forums with Frictionary," CHI 2012, Austin, Texas, USA, May 5-10, 2012, pp. 191-200, ACM Digital Library.

Godbole, Shantanu et al., "Text Classification, Business Intelligence, and Interactivity: Automating C-Sat Analysis for Services Industry," KDD'08, Las Vegas, Nevada, USA, Aug. 24-27, 2008, pp. 911-919, ACM Digital Library.

Majumdar, Debapriyo et al., "Privacy Protected Knowledge Management in Services with Emphasis on Quality Data," CIKM'11, Glasgow, Scotland, UK, Oct. 24-28, 2011, pp. 1889-1894, ACM Digital Library.

Shag, Qihong et al., "EasyTicket: A Ticket Routing Recommendation Engine for Enterprise Problem Resolution," VLDB'08, Auckland, New Zealand, Aug. 24-30, 2008, 4 pages, ACM Digital Library.

Navarro, Gonzalo, "A Guided Tour to Approximate String Matching," ACM Computing Surveys, Mar. 2001, pp. 31-88, vol. 33, No. 1, ACM Digital Library.

\* cited by examiner

"Large % of tickets clustered in category X missed their SLAs"
- "pcat==>data defect ; %SLA Missed ::
- "pcat==>Following Old Jobs ; %SLA M
- "pcat==>duty calculated ; %SLA Miss
- "pcat==>schedule previous ; %SLA Mi
- "pcat==>learning manager ; %SLA Mi
- "pcat==>fc
- "pcat==>O;
- "pcat==>Failed ;                    %SL
- "pcat==>Jobs and Failed Due to a Con

411

"High Average Turnaround time for tickets in this category"
- "pcat==>duty calculated ; Avg. Turnaround times (
- "pcat==>learning manager ; Avg. Turnaround tim
- "pcat==>Ticket Opened ; Avg. Turnaround tim
- "pcat==>Daily Calculation Failed ; Avg. Turnaround tim
- "pcat==>Error when Trying ; Avg. Turnaround tim
- "pcat==>Ticket                         ;g. Turnaround 1
- "pcat==>Unable to Access ; Avg. Turnaround times
- "pcat==>errors message ; Avg. Turnaround time (
- "pcat==>Associate not Able ; Avg. Turnaround tim
- "pcat==>;                              Turnaround

AUTOMATIC GENERATION OF ACTIONABLE RECOMMENDATIONS FROM PROBLEM REPORTS

BACKGROUND

Generally, there has been an ongoing trend to assign maintenance of large applications and application portfolios of a business to third parties specializing in application maintenance. These third parties are generally tasked to deliver the best possible maintenance at the lowest cost. To do so, they need to identify repeat problem areas, which cause significant maintenance issues, and seek a unified remedy to avoid the costs spent on fixing these individually. These repeat areas, in a sense, represent major, evolving areas of need, or requirements, for the customer.

Over time, each application maintenance team collects a rich repository of problem "tickets" (wherein a ticket represents a submission of a specific problem for resolution). The information about the problem is typically embedded in the unstructured text of these tickets. It can be appreciated that evolving needs of a customer may end up being buried or unaddressed as repeating groups of tickets continue to be submitted. To resolve this, repeat problems are conventionally found by manual analysis, but wholly apart from the resource and personnel costs needed in such a capacity, effective solutions are heavily tied to a volatile variable representing the collective experience of the team solving them.

BRIEF SUMMARY

One aspect of the invention provides a method of handling information technology tickets, the method comprising: utilizing at least one processor to execute computer code configured to perform the steps of: receiving a plurality of information technology tickets; clustering the tickets into categories; identifying a problem area with respect to at least one of the categories; and automatically generating at least one recommendation for addressing the problem area.

Another aspect of the invention provides an apparatus for handling information technology tickets, the apparatus comprising: at least one processor; and a computer readable storage medium having computer readable program code embodied therewith and executable by the at least one processor, the computer readable program code comprising: computer readable program code configured to receive a plurality of information technology tickets; computer readable program code configured to cluster the tickets into categories; computer readable program code configured to identify a problem area with respect to at least one of the categories; and computer readable program code configured to automatically generate at least one recommendation for addressing the problem area.

An additional aspect of the invention provides a computer program product for handling information technology tickets, the computer program product comprising: a computer readable storage medium having computer readable program code embodied therewith, the computer readable program code comprising: computer readable program code configured to receive a plurality of information technology tickets; computer readable program code configured to cluster the tickets into categories; computer readable program code configured to identify a problem area with respect to at least one of the categories; and computer readable program code configured to automatically generate at least one recommendation for addressing the problem area.

A further aspect of the invention provides a method comprising: accepting a plurality of information technology tickets; finding an unstructured attribute in each of the information technology tickets; and clustering the information technology tickets into groups based on the unstructured attribute; the clustering comprising applying at least two clustering methods and merging results of the at least two clustering methods.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 4 schematically depicts an illustrative working example of a screen shot showing guided recommendations.

DETAILED DESCRIPTION

Figure 1:
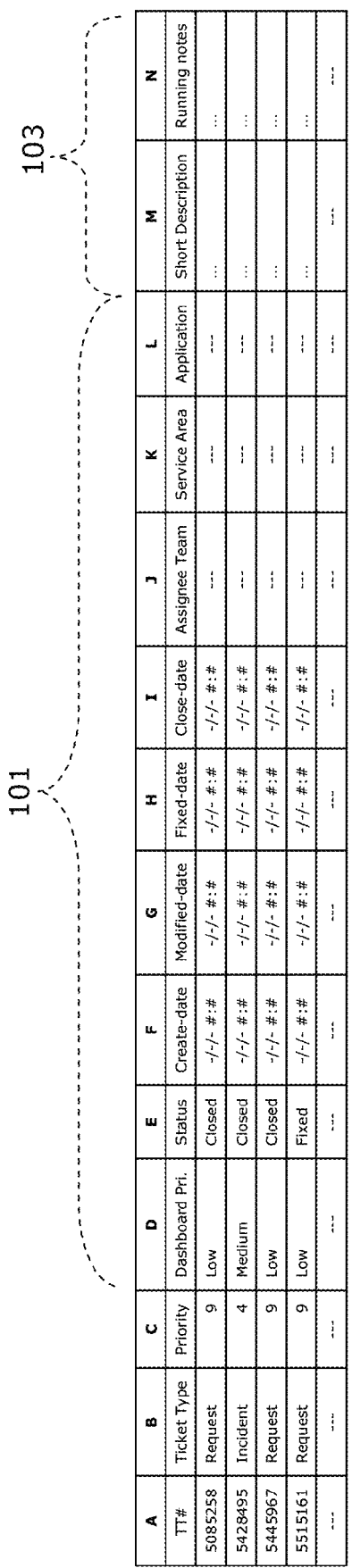
FIG. 1 schematically illustrates a screen shot showing accepted input.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-10. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 11. In accordance with an example embodiment, most if not all of the process steps, components and outputs discussed with respect to FIGS. 1-10 can be performed or utilized by way of a processing unit or units and system memory such as those indicated, respectively, at 16' and 28' in FIG. 11, whether on a server computer, a client computer, a node computer in a distributed network, or any combination thereof.

Figure 7:
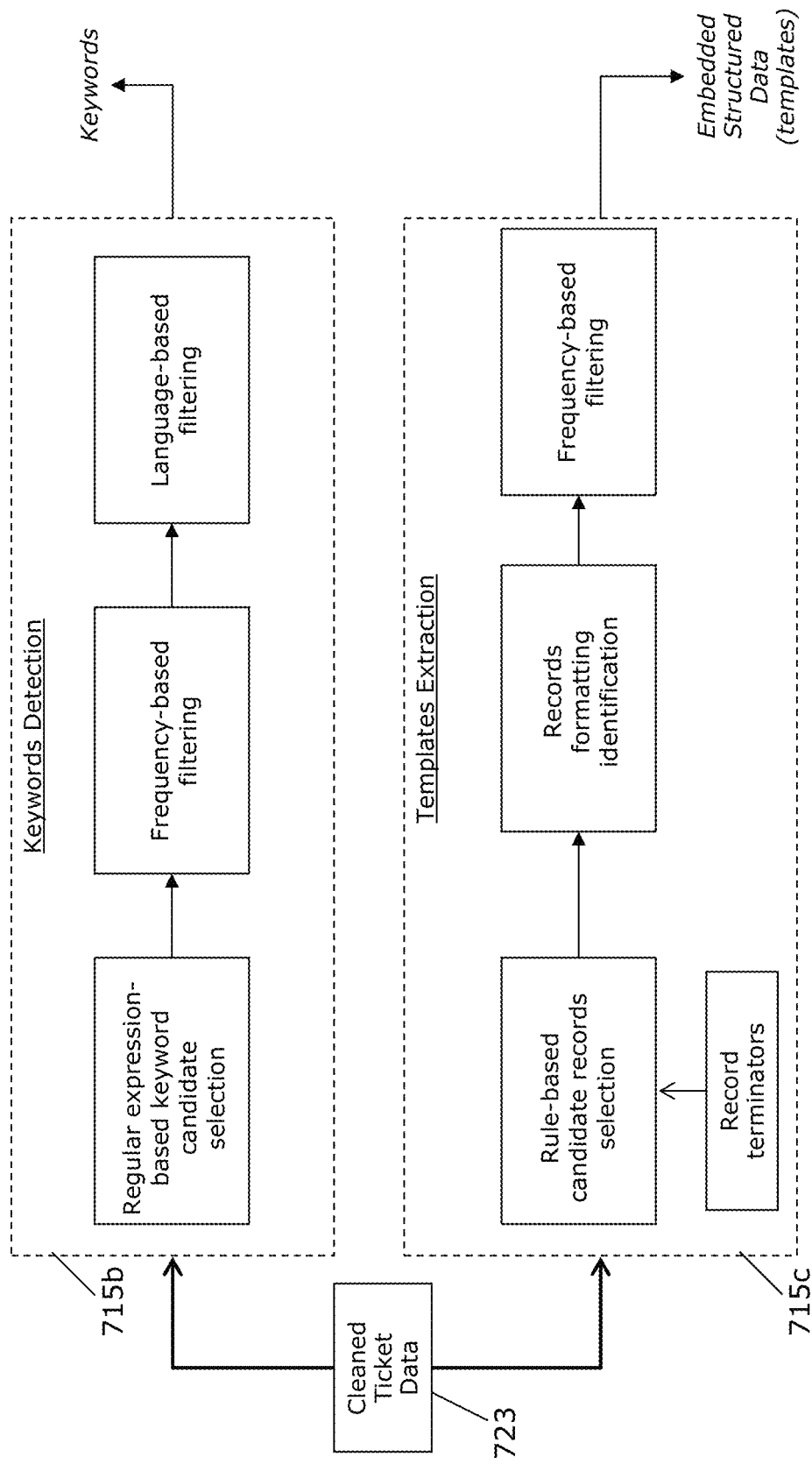
Figure 8:
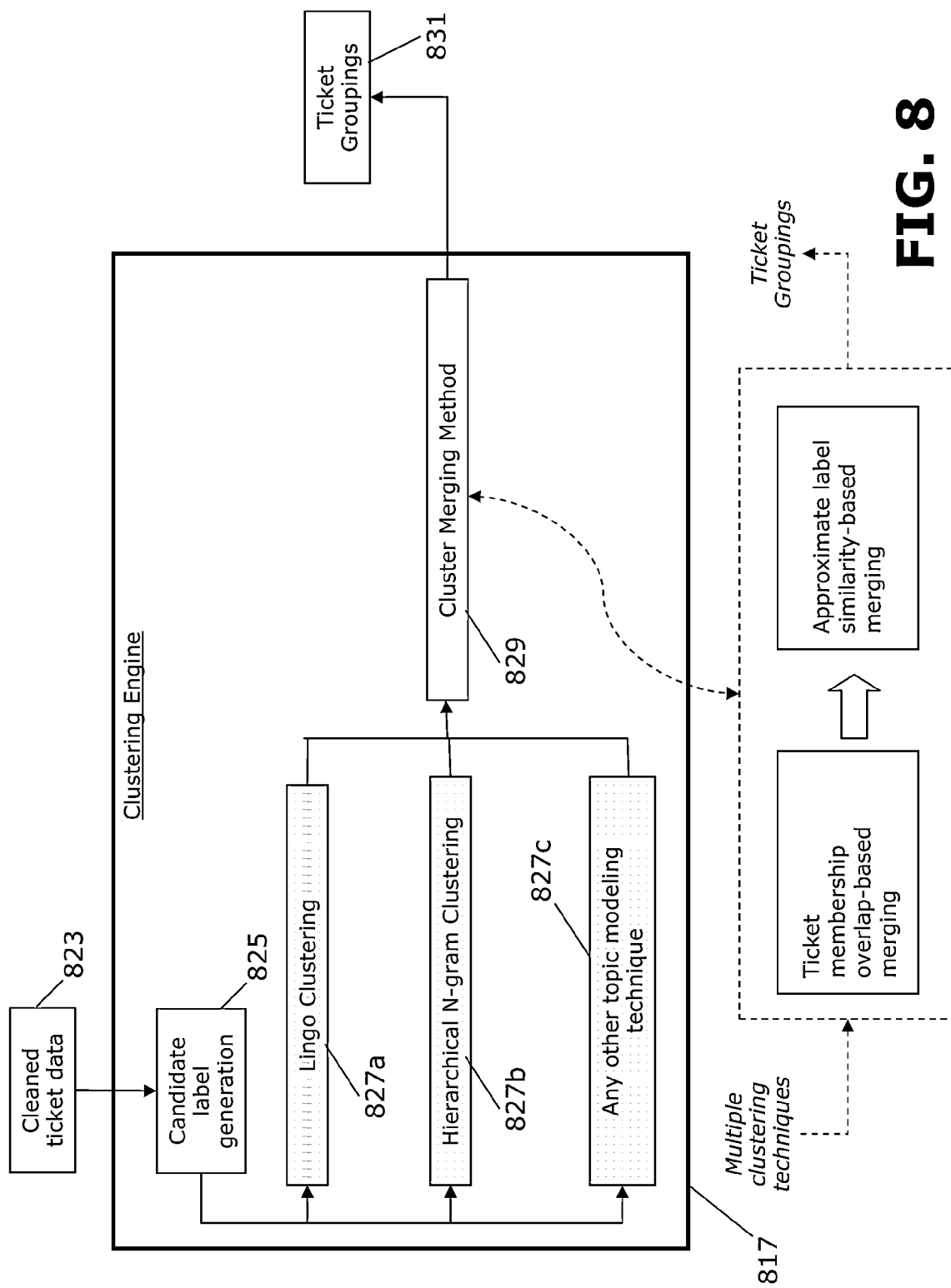
FIG. 8 schematically illustrates a working example of a grouping or clustering process.
Figure 9:
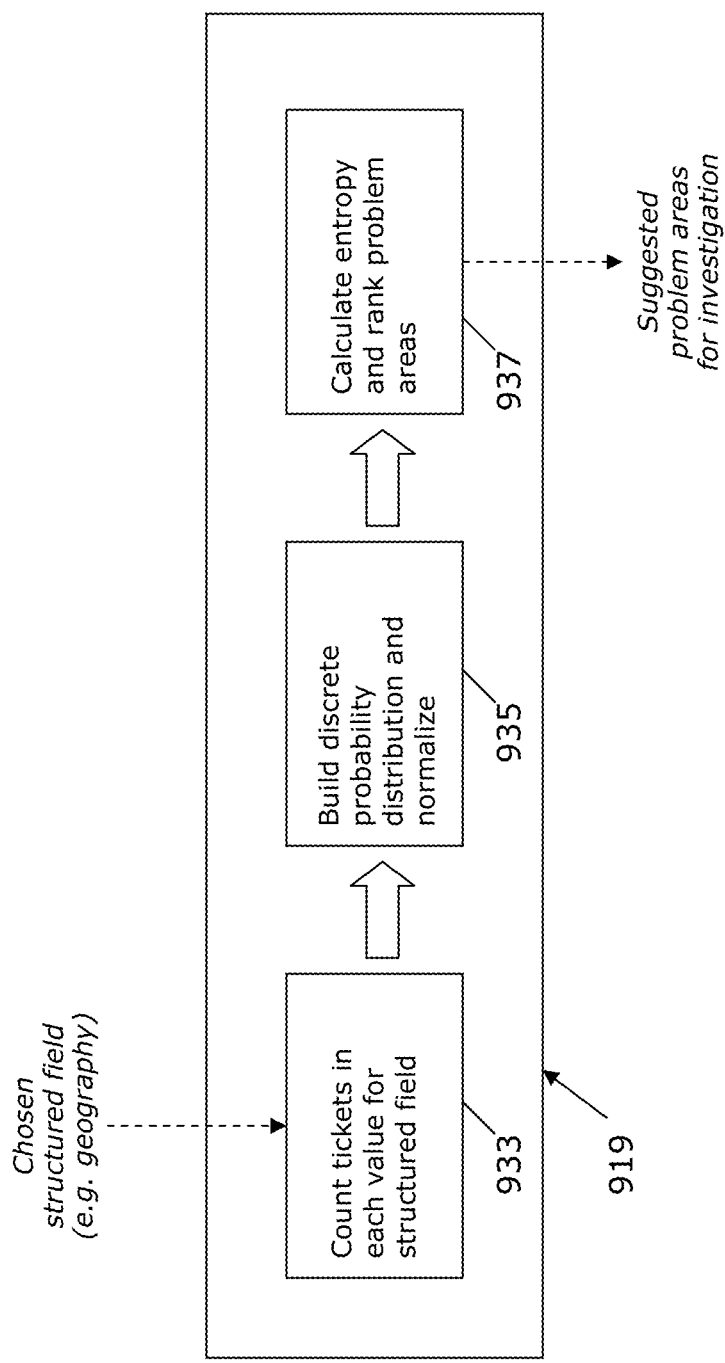
FIG. 9 schematically illustrates a working example of a recommendation generation process.

To facilitate easier reference, in advancing from FIG. 1 to and through FIG. 9, a reference numeral is advanced by a multiple of 100 in indicating a substantially similar or analogous component or element with respect to at least one component or element found in at least one earlier figure among FIGS. 1-9.

Broadly contemplated herein, in accordance with at least one embodiment of the invention, are methods and arrangements for automatically analyzing problem tickets to discover groups of problems being reported in them and to provide meaningful, descriptive labels to help interpret such groups. An approach, as broadly contemplated herein, incorporates a cleansing phase to handle the high level of noise observed in problem tickets and a method to incorporate multiple text clustering techniques and merge their results in a meaningful manner. An attempt is thereby made to discover as many of the underlying problem groups as possible, such that each group could be addressed with a relatively unified, more effective, lower-cost response.

FIG. 1 schematically illustrates a screen shot showing input accepted in accordance with at least one embodiment of the invention. Shown is a list of tickets, each comprising structured fields 101 (e.g., as shown in the present example, dashboard priority, status, create date, modified date, fixed date, close date, assignee team, service area and application) and unstructured fields 103 (e.g., as shown in the present example, short description and running notes).

Figure 2:
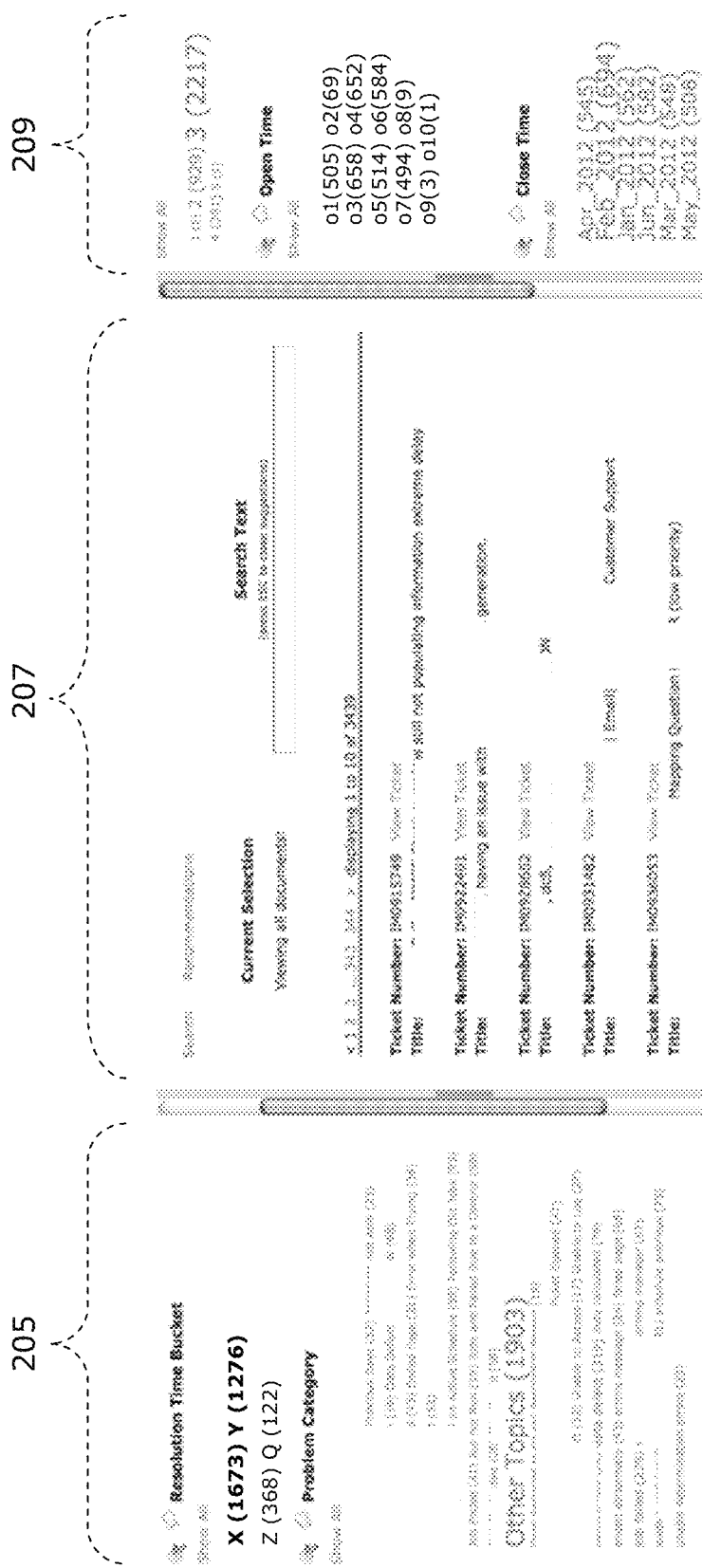
FIG. 2 schematically illustrates a screen shot showing clustered output.

FIG. 2 schematically illustrates a screen shot showing clustered output provided in accordance with at least one embodiment of the invention. Sections 205 and 209 in particular show the result of clustering into different types of categories, while section 207 shows a listing of all tickets belonging to a selected cluster. (In general, when any category in section 205 or 209 is selected, everything shown in sections 205-209 is then specific to the selected category only.) For example, in section 205 clusters are shown with respect to resolution time (here, with time ranges labeled generally as Y, Y, Z, Q) and problem categories. Generally, clusters of common problem areas can be identified via using a combination of clustering techniques. It is helpful for cluster labels to be readable and self-explanatory from the point of view of team SMEs (subject matter experts); e.g., descriptive phrases can be employed as opposed to mere collections of words. By way of noise filtering, any clustering technique used can serve to reduce the number of uninformative clusters. Further, by using an advantageous combination of clustering techniques, it can be possible to cluster machine-generated as well as user-authored tickets.

Figure 3:
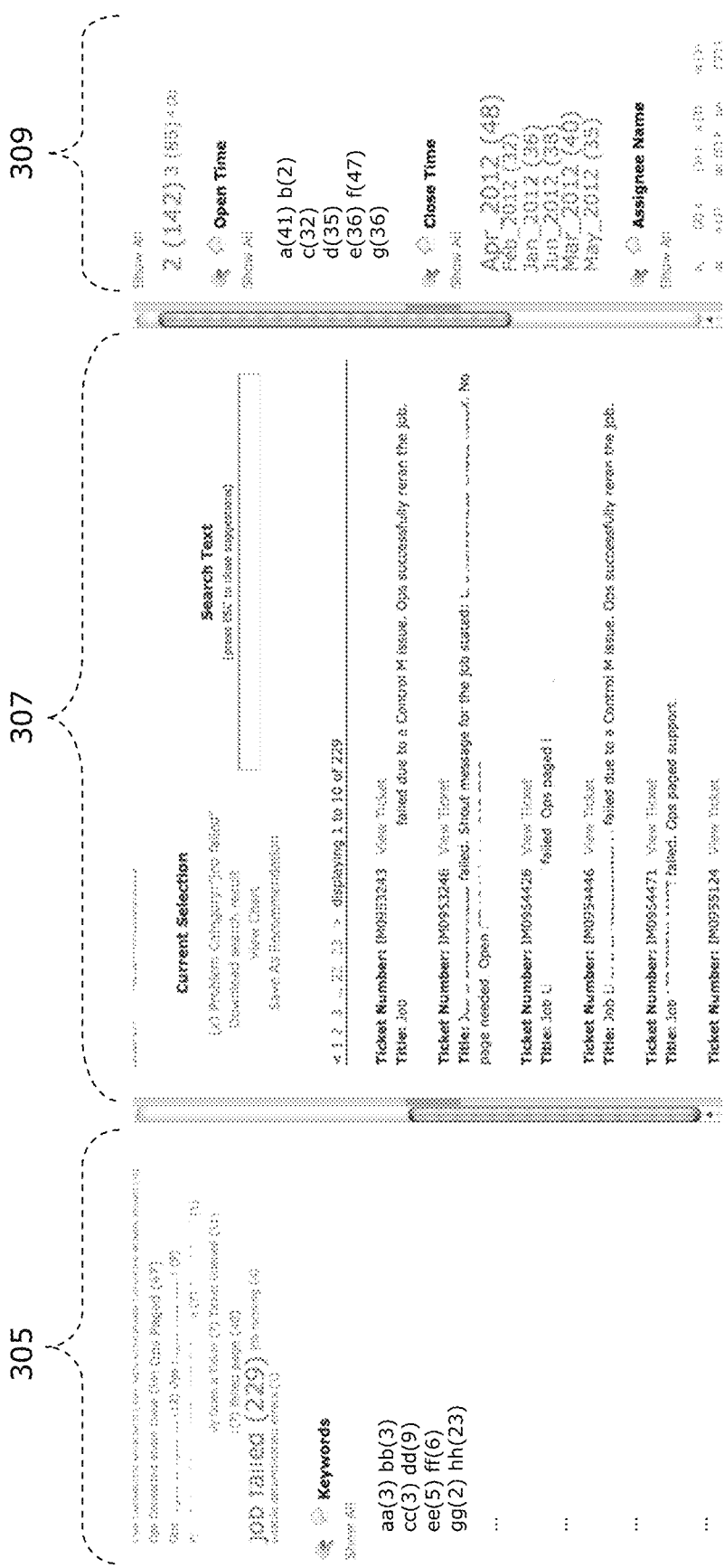
FIG. 3 schematically depicts an illustrative working example of a screen shot showing clustered output.

FIG. 3 schematically depicts an illustrative working example of a screen shot showing clustered output, in accordance with at least one embodiment of the invention. As seen in section 305, the category "jobs failed" has been selected and the keywords shown then represent a breakdown within that category. Section 307 provides a specific listing of tickets within the "job failed" cluster (and thus, an opportunity to click on and investigate each ticket individually) while section 309 provides a breakdown of open and close times with respect to the "job failed" cluster; thus, one can investigate tickets that specifically failed with respect to a given close time, especially if one month stands out among others in that respect.

In accordance with at least one embodiment of the invention, a subsequent step to problem clustering involves the generation of recommendations for further action. Accordingly, FIG. 4 schematically depicts an illustrative working example of a screen shot showing guided recommendations for being addressed by a predetermined team or individual. Section 411, by way of example, provides examples where a large percentage of tickets clustered in a given category or topic (e.g., "data defect", "duty calculated", "schedule previous", etc.) failed to fulfill aspects of their SLAs (service level agreements). Section 413 provides examples where there was a high average turnaround time for tickets in a given category.

Figure 5:
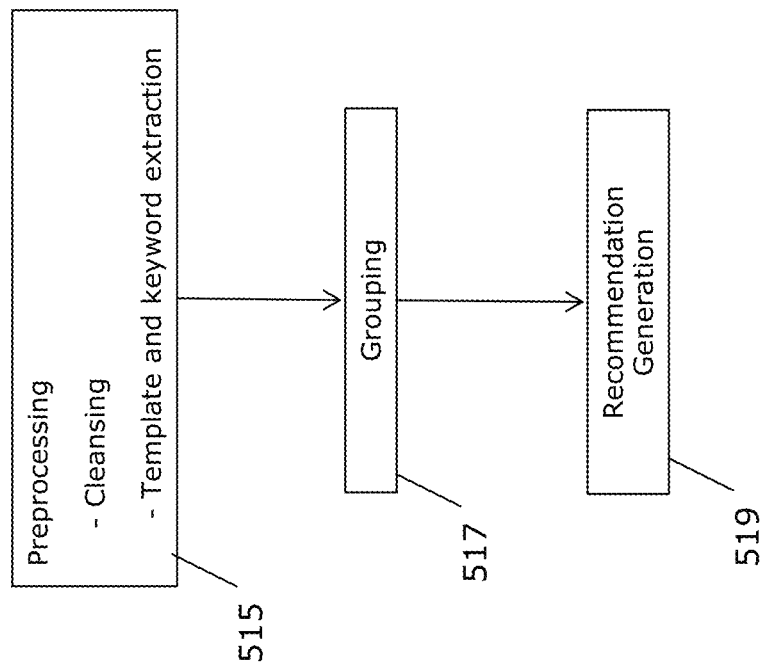
FIG. 5 schematically illustrates a general method of clustering and recommendation generation.

FIG. 5 schematically illustrates a general method of clustering and recommendation generation, in accordance with at least one embodiment of the invention. In a preprocessing step 515, cleansing and template/keyword extraction can be undertaken by any of a very wide variety of suitable known techniques. In the grouping step 517, multiple clustering techniques can be applied wherein each technique so employed can be used in optimal manner, with results then merged to yield a unified cluster view. In the recommendation generation step 519, there can be employed a ranking of auto-inferred clusters based on operational data of interest. Further details of these steps, as may be employed, can be appreciated from further discussion below.

Figure 6:
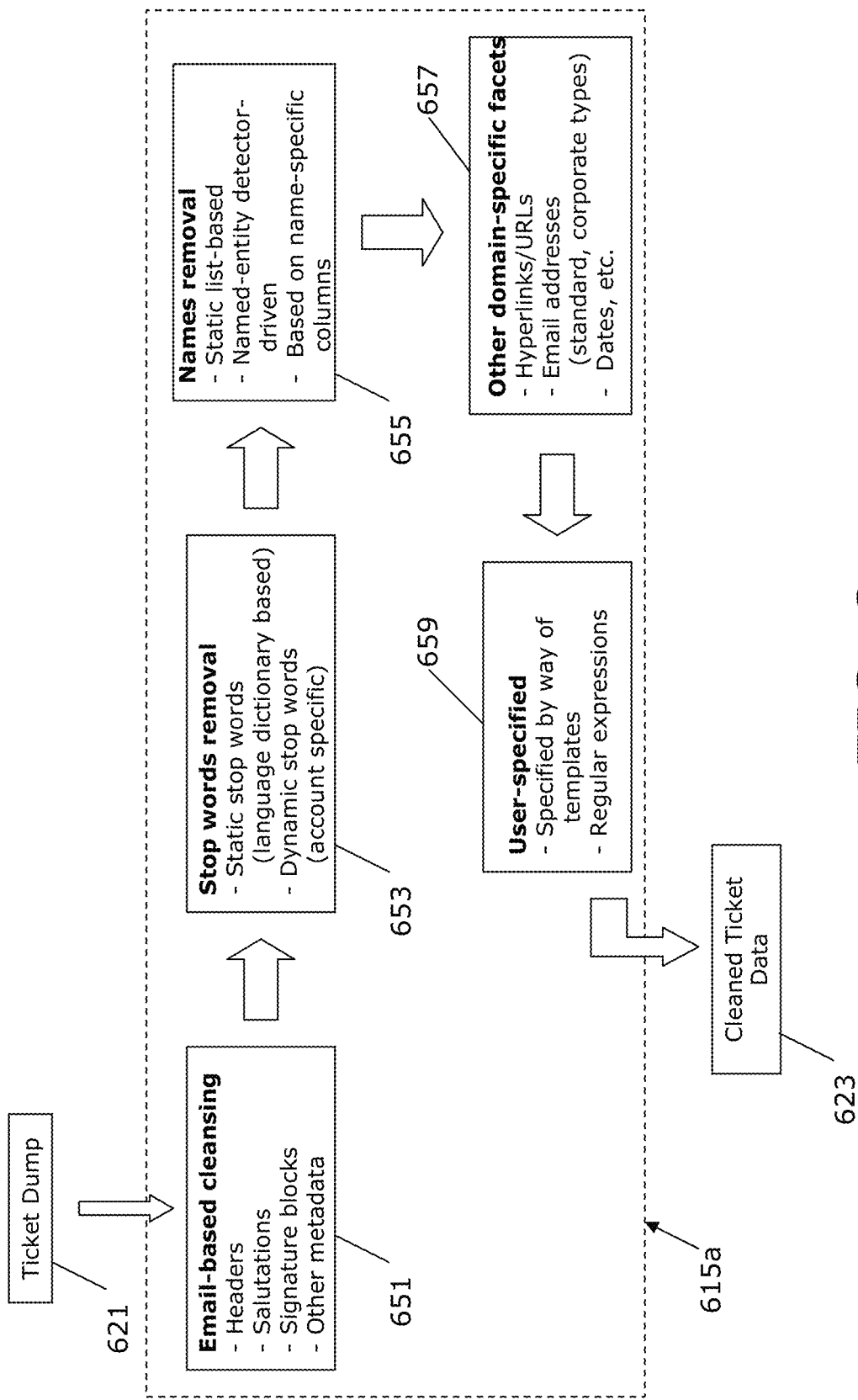
FIGS. 6 and 7, respectively schematically illustrate working examples of data cleansing and template/keyword extraction processes.

FIG. 6 schematically illustrates a working example of data cleansing (e.g., as a substep of preprocessing 515 as noted in FIG. 5), in accordance with at least one embodiment of the invention. As shown in FIG. 6, a data cleansing process 615a can include several steps: email-based cleansing, stop words removal, names removal, removal based on other domain-specific facets, and user-specified removal. Thus, an initial "ticket dump" 621, or influx of tickets yet to be cleansed, results in cleaned ticket data 623 after the several noted steps take place. Details on these steps will now be discussed.

In accordance with at least one embodiment of the invention, in a first step (or heuristic) 651, email-specific noise is removed. Since incoming data can contain copy-pasted email threads, regular expressions are employed to remove noise arising from them. There are thus removed: email headers (e.g., From:, To:, Cc:, Bcc:, Subject:, etc.), commonly used salutations (e.g., Hi, Hello, Dear, Hey), signature blocks that usually occur at the end of email messages, and email formats such as abc@foo.com ("regular type") and/or <Name>/<Country>/<Company> ("enterprise type").

In accordance with at least one embodiment of the invention, in a second step (or heuristic) 653, context-specific stop words are removed. For this, there is employed a list of words provided by the user as stop words ("dynamic"), leveraging domain knowledge in the process, over and above a generic English stop words list ("static") that many other techniques might employ. For example, in a problem ticket dump dealing with issues for particular software, certain software-related or proprietary terms might occur very frequently but otherwise could be uninformative.

In accordance with at least one embodiment of the invention, in a third step (or heuristic) 655, names are removed. Here, "static" list-based names can be removed in addition to those detected by a named entity or based on name-specific columns. As such, to the extent that personal names indeed may be found in text, they typically might not help with discerning the technical problems, yet their frequent occurrence can hinder clustering. Thus, they can be removed by providing an ability to specify them (if available in the ticket dump) in columns such as Resolution Owner, Customer, etc., to the extent that these represent names commonly observed in ticket descriptions.

In accordance with at least one embodiment of the invention, in a fourth step (or heuristic) 657, other domain-specific facets can be rooted out (e.g., via regular expressions) such as hyperlinks and URLs, email addresses (e.g., standard or corporate types), dates and numbers, etc. Additionally, in a fifth step (or heuristic) 659, a user can specify removal that is guided by way of templates or by way of regular expressions.

In accordance with at least one embodiment of the invention, FIG. 7 shows a process of template and keyword extraction (e.g., as a substep of preprocessing 515 as noted in FIG. 5). As shown in FIG. 7, starting with cleaned ticket data 723, a keyword detection process 715*b* can include steps of regular expression-based keyword candidate selection, frequency-based filtering and language-based filtering to output keywords. Further, a template extraction process 715*c* can include steps of rule-based candidate records selection (with input including record terminators), records-formatting identification and frequency-based filtering to output embedded structured data (or templates).

FIG. 8 schematically illustrates a working example of a grouping or clustering process 817, in accordance with at least one embodiment of the invention. As shown, multiple clustering techniques can be employed to transform cleaned ticket data into ticket groupings. As shown in FIG. 8, starting with cleaned ticket data 823, multiple parallel data clustering techniques may be employed, e.g., lingo clustering 827*a*, hierarchical N-gram clustering 827*b* and one or more other suitable topic modeling techniques (827*c*). These techniques are merged in a cluster merging method (or step) 829, which may involve ticket membership overlap-based merging (which handles cluster assignment noise) and approximate label similarity-based merging (which handles spelling variations and typographical errors). The output is then ticket groupings 831. Details on the steps shown in FIG. 8 will now be discussed.

In accordance with at least one embodiment of the invention, in a first step of candidate label generation (825), there is first derived a pool of candidate cluster labels by extracting frequently occurring phrases in the ticket text and then filtering them. These can thus be used at a later point to induce labels for formed clusters. To obtain readable labels, there are detected complete phrases in the input text which: are shorter than a specified maximum term length subsequence; occur at least a specified number of times in the document set; do not cross sentence boundaries (such as periods); and discount the presence of certain words in the subsequence (words that occur too frequently). These filtered set of phrases constitute the candidate set of labels for the clustering step that follows.

In accordance with at least one embodiment of the invention, to illustrate this technique, consider the following example sentence: "Inbound GLMAST Idoc failed". From this, distinct bigrams (2-word phrases), trigrams (3-word phrases) and a 4-gram (four-word phrase) can be determined as candidates. If it is assumed that the word GLMAST is as a context-specific stop word, its presence can be considered as optional when calculating candidate labels. Assuming that the word Idoc occurs too frequently in the tickets collection, the only label remaining in the candidate set would thus be "Inbound GLMAST".

In accordance with at least one embodiment of the invention, lingo clustering (827*a*) combines the results of frequent phrase finding with the strength of latent semantic indexing to identify best labels representative of the document set involving long descriptive text in natural language, while a hierarchical n-gram technique (827*b*) is based on identifying frequently occurring n-grams (contiguous sequences of tokens of length n) in the data set which is particularly suited for short, well-formatted text (such as machine generated error log). As a common pre-processing step for both techniques, the entire ticket text is put through a stemming operation, as a standard linguistic technique commonly applied in text processing tasks. (This also applies in the case of any additional techniques 827*c* that may be used here.) For the purposes of discussion, in accordance with at least one embodiment of the invention, two example ticket sets can be used to illustrate the functioning each of the techniques, as noted below:

Example Set 1

T11: My annual leave verification.
T12: Unable to apply leave. Leave forecast balance is Zero
T13: I cant apply for leave and why I cant find annual leave balance in Pso
T14: annual leave application error
T15: Discrepancy in my leave balance.

For the above tickets (T11-T15), the expectation is then to get the following 3 clusters:

Cluster 1: T11, T13, T14 - regarding annual leave
Cluster 2: T12, T13, T15 - regarding leave balance
Cluster 3: T12, T13 - regarding apply leave Then, Example Set 2

T21: GMP: Failed ABC:aaa document
T22: IMPL: Failed DEF:ddd document
T23: BLAST: Failed XYZ:xxx document
T24: GMPL: Failed XYZ document Here, the expectation is to get the following clusters:

Cluster 1: T21, T22, T23, T24 regarding Failed Document
Cluster 2: T23, T24 regarding Failed XYZ Document The discussion now turns to lingo clustering 827a, in accordance with at least one embodiment of the invention. In what follows, "document" refers to the unstructured text data from a single problem ticket and "document set" refers to the entire ticket dump. First, the document set is represented as a term-document matrix A, where the columns of the matrix correspond to terms appearing the documents, and rows of the matrix correspond to documents. The value in each cell indicates the frequency of a term in that particular document and inversely proportional to its frequency in the entire document set. This matrix A is now decomposed using Singular Value Decomposition (or any other method such as Non-negative Matrix Factorization) to obtain an orthogonal basis of vectors in the feature space as specified here:

$$A = U * S * V^T$$

where U is the matrix of orthogonal vectors and S is the diagonal matrix of singular values.

Next, in accordance with at least one embodiment of the invention, the candidate set of labels discovered previously (from step 825) are expressed in the same term-document space by considering them as very small documents themselves, with each candidate label represented as a document constituted by the terms in the label. After this, the similarity of each such candidate label is calculated with respect to the first k orthogonal basis vectors as shown here:

$$M = U_k^T * P$$

where P is matrix of documents formed by the candidate set of labels and M is the matrix of similarity values between each candidate label in P and each of the top k basis vectors in U calculated using the cosine similarity function as $$sim(u, p) = \frac{u \cdot p}{\|u\| \|p\|} = \frac{\sum_{i=1}^{n} w_{i,u} w_{i,p}}{\sqrt{\sum_{i=1}^{n} w_{i,u}^2} \sqrt{\sum_{i=1}^{n} w_{i,p}^2}}$$

where $w_{i,u}$ and $w_{i,p}$ represent the weights of base vector U and candidate label vector P respectively.

In accordance with at least one embodiment of the invention, using these cosine similarity values, a label is assigned to each of the top k basis vectors based on the one that is most similar to them from the candidate set. The final step is to assign documents to these basis vectors by calculating their cosine similarity with these vectors, and assigning them to those vectors and labels which fall within a threshold. Note that, this could result in some tickets being assigned to multiple vectors, but this can generally be preferred over picking only the closest one (which would be sensitive to relative similarities between documents). Therefore, this entire process results in grouping the documents according to orthogonal basis vectors that guarantee diversity of topics covering the term-document space and also are attached with most frequently occurring phrases that are most similar to these document clusters, thus resulting in well-labeled clusters. Thus, applying this clustering technique on Example Set 1 yields the following labeled clusters:

Cluster 1: Label - Annual Leave, Tickets - T11, T13, T14
Cluster 2: Label - Leave Balance, Tickets - T12, T13, T15
Cluster 3: Label - Apply, Tickets - T12, T13 which is in line with what is desired. However, with regard to Example Set 2, it yields only the following cluster:

Cluster 2: T23, T24 with Label Failed XYZ Document

Here, it fails to identify Cluster 1 since there were only 2 words common across all tickets but 4 words uncommon.

In hierarchical N-gram clustering 827b, in accordance with at least one embodiment of the invention, a first step involves filtering the set of phrases that will be used to create the clusters. To do so, there are first identified all bigrams extracted in the candidate label generation phase (825) and then, for each bigram, form a cluster from all the tickets where this bigram appears. This could result in a cluster of tickets being associated with multiple bigrams (due to multiple common phrases). Therefore, to decide which of the associated bigrams to choose as the label for such a cluster, the bigram having a higher log-likelihood ratio is picked. The log-likelihood ratio measures the deviation between the observed data "word1 word2" and what would be expected if word1 and word2 were independent. The higher the score, the less evidence there is in favor of concluding that the words are independent. The log-likelihood is calculated as follows:

$$LL = 2\left(n_{11}\log\frac{n_{11}}{m_{11}} + n_{12}\log\frac{n_{12}}{m_{12}} + n_{21}\log\frac{n_{21}}{n_{21}} + n_{22}\log\frac{n_{22}}{n_{22}}\right)$$

where $n_{11}$ is the number of times word1 word2 occur together, and $n_{12}$ is the number of times word1 occurs with some word other than word2, and so on. Here, the $m_{ij}$ values are the expected values of the words occurring together and are calculated by taking the product of their associated marginals and dividing by the sample size, as follows:

$$m_{11} = \frac{n_{1p}n_{p1}}{n_{pp}}$$

where $n_{1p}$ is the number of times in total that word1 occurs as the first word in a bigram, and so on. The formula is similarly extended for tri-grams and 4-grams (and possibly even higher-order N-grams).

With this, in accordance with at least one embodiment of the invention, each cluster now has exactly one label. Since each ticket can (and does) contain multiple bigrams, it could still be a part of multiple clusters and have multiple labels. Therefore, if a ticket has multiple such labels, the ticket is kept in only that cluster whose label has a higher frequency, and removed from the other; if the labels have the same frequency, then essentially any of them can be picked. Thereupon, there results a set of ticket clusters labeled with bigram phrases, where each ticket is put only in one cluster. Similarly, the above process is repeated using the tri-grams as the candidate phrase set, 4-grams and so on. Once the labels to be used have been filtered using this process, there are then created final clusters by combining the occurrence of these labels in the tickets.

To illustrate a working example of hierarchical N-gram clustering, in accordance with at least one embodiment of the invention, consider the tickets in Example Set 2. Here, the two bigrams in the candidate set are failed document and failed xyz, but the only cluster generated from bigrams is failed document because all tickets in failed xyz are subsumed in it. The tri-gram step generates a cluster containing tickets T23, T24 with the label failed xyz document. Hence, the final hierarchical clustering that emerges is as follows:

---
Cluster 1: T21, T22, T23, T24 with Label Failed Document
Cluster 1.1: T23, T24 with Label Failed XYZ Document
--- thus conforming to what is desired. Applying the same technique on Example Set 1 yields the following labeled clusters:

---
Cluster 1: Label - Annual Leave, Tickets - T11, T13, T14
Cluster 2: Label - Leave Balance}, Tickets - T13, T15
Cluster 3: Label - Apply, Tickets - T12, T13
---

It can be observed that T12, which is also about leave balance, is missing from Cluster 2 because the actual phrase occurring here is leave forecast balance. This shows that this technique works well when the text to be clustered is concise and template based. Hence, in an overall approach it can be employed solely when the text length is restricted to a few sentences.

In view of the foregoing, in accordance with at least one embodiment of the invention, looking at the results with the two example sets, one can observe the complementary advantages of the two clustering techniques, which together provide suitable robustness to deal with the variance in the unstructured nature of the ticket text.

For cluster merging 829, in accordance with at least one embodiment of the invention, it can be appreciated that each of the above two techniques (and any additional techniques 827c) results in the ticket dump being clustered into ticket groups with each group labeled by a descriptive phrase. Thus, in the merging phase itself, outputs of the two clustering techniques are combined to present a unified clustering result by merging the clusters and their corresponding labels using the following heuristics: high percentage of document overlap, and high similarity between labels.

In accordance with the first heuristic, in accordance with at least one embodiment of the invention, if the percentage of overlap in tickets across clusters from the two clustering techniques is high enough (e.g., employing a threshold of 80%), the clusters are merged into a single cluster by forming a union set of tickets from the two clusters. To pick the label of the new merged cluster, the longer of the two constituent cluster labels is simply picked.

In accordance with the second heuristic, in accordance with at least one embodiment of the invention, it can be noted that over a large amount of ticket data the same typographical errors repeated by the same practitioners can lead to distinct clusters varying only by the difference of the typo. Another reason could also be due to variations in spellings employed.

For example, a cluster labeled as "Job Canceled", and another labeled as "Job Cancelled", essentially represent the same underlying problem. In such cases, there is determined the Levenshtein distance (see G. Navarro, "A guided tour to approximate string matching", ACM computing surveys (CSUR), 33(1):31-88, 2001) between the labels normalized by the length of the longer of the two labels, and a check is made as to whether it is within a threshold (e.g., 0.2). If so, the two clusters are collapsed into a single cluster and one of the two labels is picked as the label for the merged cluster. Note that, to avoid merging distinct labels differing by a small string difference not due to an error (e.g., "Cost Error" vs "Post Error"), the words can be filtered through an English language dictionary list. Additionally, clusters with labels where the order of words is flipped (e.g., "Job Failed" & "Failed Job") are collapsed into one.

Accordingly, in accordance with at least one embodiment of the invention, at the end of this cluster merging technique 829, there is obtained a unified set of document clusters along with their corresponding labels.

FIG. 9 schematically illustrates a working example of a recommendation generation process 919, in accordance with at least one embodiment of the invention. As shown in FIG. 9, starting with a chosen structured field (e.g., geography), tickets can then be counted with respect to each value for the structured field (933). A discrete probability distribution is built and normalized (935), and entropy is calculated with problem areas then ranked (937). Based on rank, problems areas are then suggested for investigation. Details on these steps will now be discussed.

In accordance with at least one embodiment of the invention, based on key operational metrics, discovered problems and resolution categories can be correlated with pre-specified metrics such as: SLA Breaches (calculated from Closed and Due dates); turnaround time (calculated from Open and Closed Dates); and ticket volumes (determined by quantifying output from the earlier clustering process). Recommendations may then be generated on the basis of specificity and diversity of distributions (employing, e.g., entropy, variance) of other structured attributes (e.g., user-specified) with respect to the problem/resolution categories.

In accordance with at least one embodiment of the invention, recommendations within each group can be ranked on the basis of any of a variety of suitable factors, e.g., volume, correlation score and entropy values. The recommendations thereby are suggested as candidates for possible further investigation, and can be used to derive insights. By way of a specific working example, e.g., it could be determined that 90% of connection errors are resolved by restarting the messaging Server. Users can thus then be trained, or information can be added to FAQ (frequently asked questions) to prevent or forestall the logging of such tickets. In another example, if it is determined that 95% of authentication failures happen in a specific geographical region, then an authentication module specific to that region can be addressed. In yet another example, if it is determined that 45% of password resets take under a day to resolve but 50% take over a month, some investigation can be prompted as to why such a stark variation exists.

In accordance with at least one embodiment of the invention, while a great variety of entropy calculation techniques can be used, a particularly effective one is as follows. Once the user specifies the structured field with respect to which they wish to identify specificity or diversity, there is built (935) a discrete probability distribution across values of the structured field based on the count of tickets for each problem cluster. Let $[n_{s_1}, n_{s_1}, \ldots, n_{s_m}]$ be the counts of tickets for the $s_m$ different values of structured field S for a particular problem cluster. The discrete probability distribution for this field is obtained by normalizing these counts as $$p_s = \left[ \frac{n_{s_1}}{\sum\limits_{m}^{m} n_{s_j}}, \frac{n_{s_1}}{\sum\limits_{m}^{m} n_{s_j}}, \ldots, \frac{n_{s_m}}{\sum\limits_{m}^{m} n_{s_j}} \right] = [x_{s_1}, x_{s_2}, \ldots, x_{s_m}]$$

There is then calculated the entropy of this discrete probability distribution $p_s$, as given here:

$$H(x_s) = -\sum_{i=1}^{m} p(x_{s_i}) \log_b p(x_{s_i})$$

In accordance with at least one embodiment of the invention, following this, to highlight the recommendations, the problem clusters are ranked based on their entropy values and the ones with high entropy (above a particular threshold) are shown for cases where the user is looking for specificity of distributions, while the ones with low entropy (below particular threshold) are for cases where the user is looking for diversity in the distribution. Among other things, ranking the discovered problem areas against these metrics as described above helps teams prioritize their investigations for greater service improvements.

Figure 11:
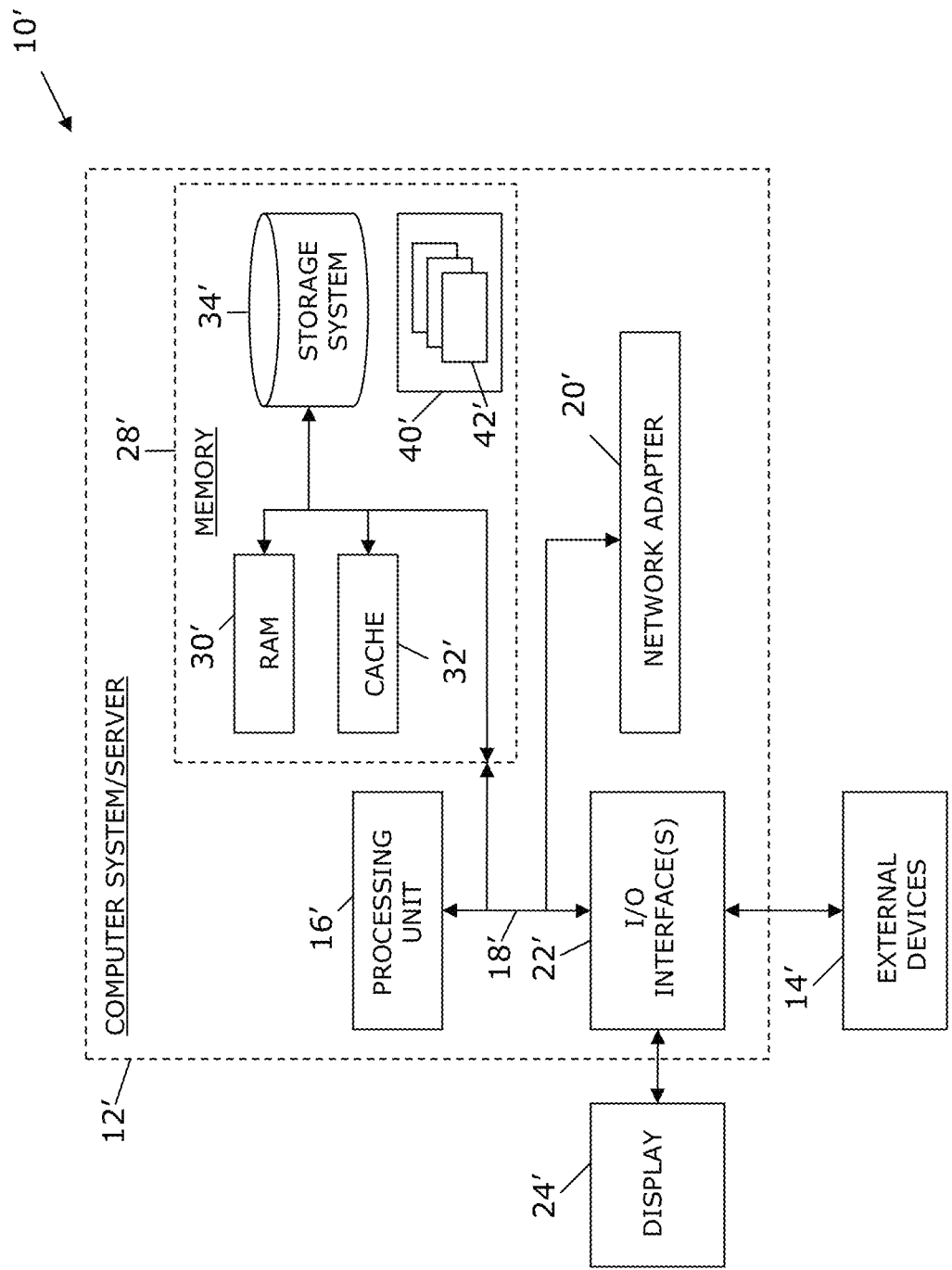
FIG. 11 illustrates a computer system.

Referring now to FIG. 11, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

Figure 10:
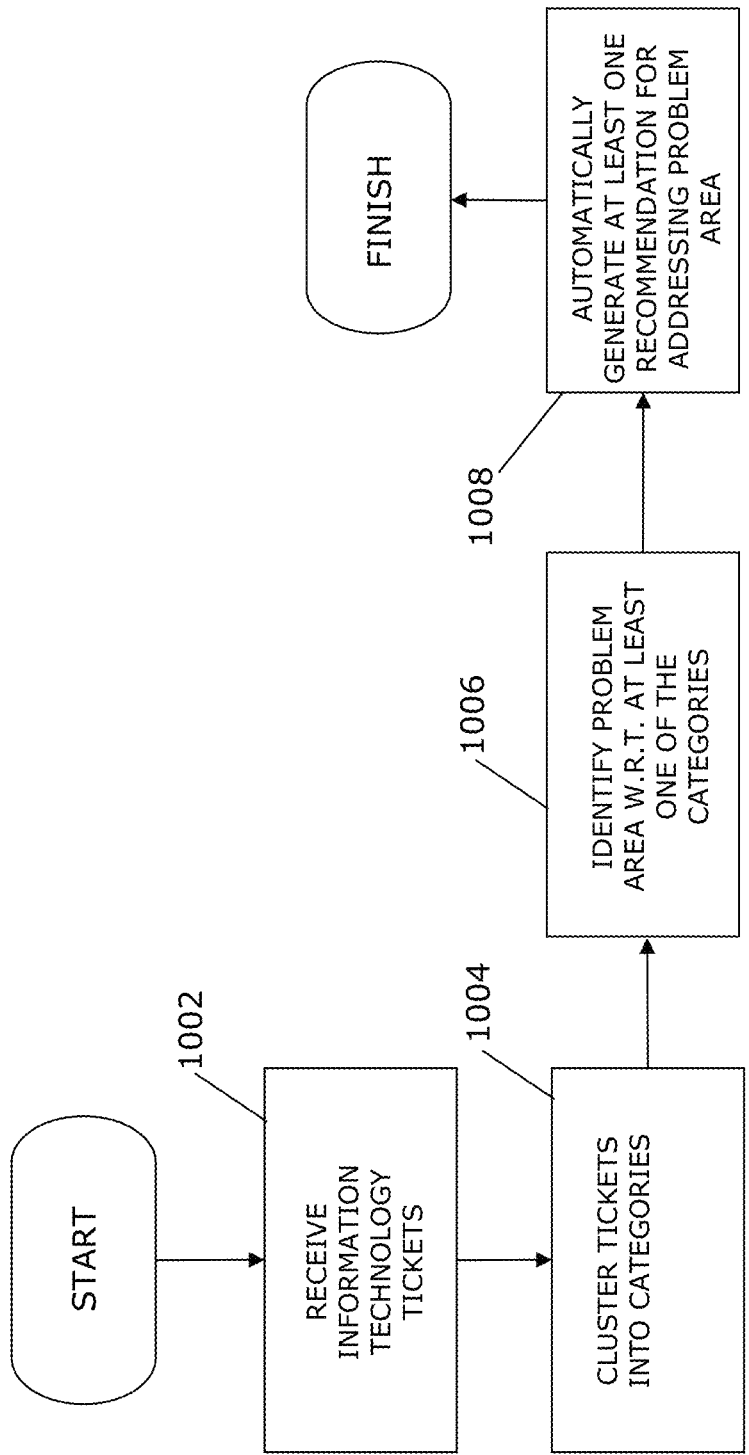
FIG. 10 sets forth a process more generally for handling information technology tickets.

FIG. 10 sets forth a process more generally for handling information technology tickets, in accordance with at least one embodiment of the invention. It should be appreciated that a process such as that broadly illustrated in FIG. 10 can be carried out on essentially any suitable computer system or set of computer systems, which may, by way of an illustrative and non-restrictive example, include a system such as that indicated at 12' in FIG. 11. In accordance with an example embodiment, most if not all of the process steps discussed with respect to FIG. 10 can be performed by way of a processing unit or units and system memory such as those indicated, respectively, at 16' and 28' in FIG. 11.

As shown in FIG. 10, in accordance with at least one embodiment of the invention, a plurality of information technology tickets are received (1002). The tickets are clustered into categories (1004), and a problem area is identified with respect to at least one of the categories (1006). At least one recommendation is automatically generated for addressing the problem area (1008).

As shown in FIG. 11, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of handling information technology tickets, said method comprising:
utilizing at least one processor to execute computer code configured to perform the steps of:
receiving a plurality of information technology tickets;
preprocessing the plurality of information technology tickets;
clustering via applying at least one clustering technique, the preprocessed plurality of information technology tickets into categories, wherein each category comprises technology tickets having at least one common characteristic;
identifying a problem area for recommendation generation with respect to at least one of the categories, wherein said identifying comprises building a discrete probability distribution with respect to a plurality of problem areas and calculating an entropy value with respect to each of the problem areas; and
automatically generating at least one recommendation for addressing the problem area.

2. The method according to claim 1, wherein said preprocessing comprises cleansing the tickets.

3. The method according to claim 1, wherein said preprocessing comprises performing template and keyword extraction with respect to the tickets.

4. The method according to claim 1, wherein said clustering comprises applying at least two clustering techniques and merging results from the techniques.

5. The method according to claim 4, wherein the two techniques comprise at least one technique selected from the group consisting of: a lingo clustering technique, and a hierarchical N-gram clustering technique.

6. The method of claim 4, wherein the merging comprises using at least one heuristic to combine resulting clusters of each of the at least two clustering techniques into at least one category.

7. The method according to claim 1, wherein said identifying comprises correlating the problem area with respect to at least one pre-defined metric.

8. The method according to claim 1, wherein said generating comprises providing at least one item for further investigation, via said identifying comprising determining a specificity and diversity of at least one distribution with respect to the problem area.

9. The method of claim 8, wherein said identifying further comprises ranking the plurality of problem areas based upon the entropy values, wherein the problem areas with a high entropy value are shown for specificity and problems areas with a low entropy value are shown for diversity.

10. The method according to claim 1, wherein said identifying further comprises ranking the plurality of problem areas based upon the entropy values.

11. An apparatus for handling information technology tickets, said apparatus comprising:
at least one processor; and
a computer readable storage medium having computer readable program code embodied therewith and executable by the at least one processor, the computer readable program code comprising:
computer readable program code that receives a plurality of information technology tickets;
computer readable program code that preprocesses the plurality of information technology tickets;
computer readable program code that clusters via applying at least one clustering technique, the preprocessed plurality of information technology tickets into categories, wherein each category comprises technology tickets having at least one common characteristic;
computer readable program code that identifies a problem area for recommendation generation with respect to at least one of the categories, wherein said identifying comprises building a discrete probability distribution with respect to a plurality of problem areas and calculating an entropy value with respect to each of the problem areas; and
computer readable program code that automatically generates at least one recommendation for addressing the problem area.

12. A computer program product for handling information technology tickets, said computer program product comprising:
a non-transitory computer readable storage medium having computer readable program code embodied therewith, the computer readable program code comprising:
computer readable program code that receives a plurality of information technology tickets;
computer readable program code that preprocesses the plurality of information technology tickets;
computer readable program code that clusters via applying at least one clustering technique, the preprocessed plurality of information technology tickets into categories, wherein each category comprises technology tickets having at least one common characteristic;
computer readable program code that identifies a problem area for recommendation generation with respect to at least one of the categories, wherein said identifying comprises building a discrete probability distribution with respect to a plurality of problem areas and calculating an entropy value with respect to each of the problem areas; and
computer readable program code that automatically generates at least one recommendation for addressing the problem area.

13. The computer program product according to claim 12, wherein said computer readable program code is configured to cleanse the tickets.

14. The computer program product according to claim 12, wherein said computer readable program code that preprocesses comprises template and keyword extraction with respect to the tickets.

15. The computer program product according to claim 12, wherein said computer readable program code applies at least two clustering techniques and merges results from the techniques.

16. The computer program product according to claim 15, wherein the two techniques comprise at least one technique selected from the group consisting of: a lingo clustering technique, and a hierarchical N-gram clustering technique.

17. The computer program product according to claim 12, wherein said computer readable program code that identifies comprises correlating the problem area with respect to at least one pre-defined metric.

18. The computer program product according to claim 12, wherein said computer readable program code that generates comprises providing at least one item for further investigation, via said to identify comprising determining a specificity and diversity of at least one distribution with respect to the problem area.

19. The computer program product according to claim 18, wherein said computer readable program code that identifies further comprises ranking the plurality of problem areas based upon the entropy values.

20. A method comprising:
accepting a plurality of information technology tickets;
finding an unstructured attribute in each of the information technology tickets;
clustering, applying at least one clustering technique, the information technology tickets into groups based on the unstructured attribute, wherein each group comprises technology tickets having at least one common characteristic; and
said clustering comprising applying at least two clustering methods and merging results of the at least two clustering methods
identifying a problem area for recommendation generation with respect to at least one of the categories, wherein said identifying comprises building a discrete probability distribution with respect to a plurality of problem areas and calculating an entropy value with respect to each of the problem areas.

\* \* \* \* \*